United States Patent
Izumikawa et al.

(10) Patent No.: US 11,989,590 B2
(45) Date of Patent: May 21, 2024

(54) METHOD AND SYSTEM FOR RESOURCE ALLOCATION

(71) Applicant: SYNAPSE INNOVATION INC., Osaka (JP)

(72) Inventors: Kazuya Izumikawa, Osaka (JP); Shigeo Fujimoto, Osaka (JP)

(73) Assignee: SYNAPSE INNOVATION INC., Osaka (JP)

( * ) Notice: Subject to any disclaimer, the term of this patent is extended or adjusted under 35 U.S.C. 154(b) by 0 days.

(21) Appl. No.: 17/905,968

(22) PCT Filed: Mar. 20, 2020

(86) PCT No.: PCT/JP2020/012562
§ 371 (c)(1),
(2) Date: Feb. 9, 2023

(87) PCT Pub. No.: WO2021/186747
PCT Pub. Date: Sep. 23, 2021

(65) Prior Publication Data
US 2023/0161630 A1 May 25, 2023

(51) Int. Cl.
*G06F 9/46* (2006.01)
*G06F 9/50* (2006.01)
*G06N 3/12* (2023.01)

(52) U.S. Cl.
CPC ............ *G06F 9/5038* (2013.01); *G06N 3/12* (2013.01); *G06F 2209/5021* (2013.01)

(58) Field of Classification Search
CPC .................. G06F 9/5038; G06F 2209/5021
See application file for complete search history.

(56) References Cited

U.S. PATENT DOCUMENTS

| | | | |
|---|---|---|---|
| 6,434,590 B1 * | 8/2002 | Blelloch | G06F 9/5066 718/102 |
| 10,970,132 B2 * | 4/2021 | Aronovich | G06F 9/5038 |

(Continued)

FOREIGN PATENT DOCUMENTS

| | | | | |
|---|---|---|---|---|
| CN | 109597682 A | * | 4/2019 | ........... G06F 9/4881 |
| JP | H8-212264 A | | 8/1996 | |

(Continued)

OTHER PUBLICATIONS

Sriprasert et al., Genetic Algorithms for Multi-constraint scheduling: an application for the construction industry, Construction Informatics Digital Library, 2003, 12 pages. (Year: 2003).*

(Continued)

*Primary Examiner* — Diem K Cao
(74) *Attorney, Agent, or Firm* — HSML P.C.

(57) ABSTRACT

To provide a more efficient resource allocation method and system using a genetic algorithm (GA). The present technology includes a method for allocating resources to a production process including a plurality of processes, the method including allocating priorities to the plurality of processes, selecting processes executable at a first time among the plurality of processes and capable of allocating necessary resources, allocating the necessary resources to the selected processes in descending order of priorities, selecting processes executable at a second time that is later than the first time among the plurality of processes and capable of allocating necessary resources, and allocating the necessary resources to the selected processes in descending order of priorities. The present technology also includes, as a method of expressing genes of GA, not having direct allocation information for genes but having information (priority) for determining an order for allocation.

12 Claims, 3 Drawing Sheets

(56) References Cited

U.S. PATENT DOCUMENTS

2007/0169125 A1* 7/2007 Qin .................. G06F 9/5022
718/102
2008/0235695 A1* 9/2008 Itou .................. G06F 9/4881
718/103

FOREIGN PATENT DOCUMENTS

| JP | 2000330966 A | | 11/2000 | |
|----|--------------|---|---------|---|
| JP | 2002373013 A | | 12/2002 | |
| JP | 2003280714 A | | 10/2003 | |
| JP | 2015194923 A | * | 11/2015 | ........... G06F 9/5038 |

OTHER PUBLICATIONS

Goncharov et al., Genetic Algorithm for the Resource-Constrained Project Scheduling Problem, Automation and Remote Control, 2017, vol. 78, No. 6, pp. 1101-1114. (Year: 2017).*
Hamad et al., Genetic-Based Task Scheduling Algorithm in Cloud Computing Environment, IJACSA, vol. 7, No. 4, pp. 550-556. (Year: 2016).*
International Search Report and Written Opinion issued in PCT/JP2020/012562, dated Sep. 24, 2020, with English translation, 17 pages provided.
Furukawa, Masashi et al., "Practical application of multi-level job-shop scheduling using GA", Proceedings of JSPE Semestrial Meeting, The Japan Society for Precision Engineering), May 2, 2009, with English translation.

* cited by examiner

METHOD AND SYSTEM FOR RESOURCE ALLOCATION

TECHNICAL FIELD

The present technology relates to a resource allocation method and system using a genetic algorithm (GA).

BACKGROUND

GA is one of heuristic means for solving a combinatorial optimal solution. In many cases, each gene is represented by 0s and 1s, and the combination is used to solve a combinatorial optimization problem such as the knapsack problem.

Research using a GA has also been conducted when allocating each process of a production schedule to a resource and obtaining an execution order. Most of them attempt to solve the problem by allocating 0s and 1s to a matrix of time slots to which processes are allocated and resources. In many cases, this results in an inexecutable solution for each individual, and the evaluation function for evaluating each individual does not work well. Further, since the allocation of each gene represents a fixed time slot, there is room for improvement in terms of linear representation of time and time slot.

An example of obtaining the allocation of each process of the production schedule to resources and the execution order is described below.

Figure 1:
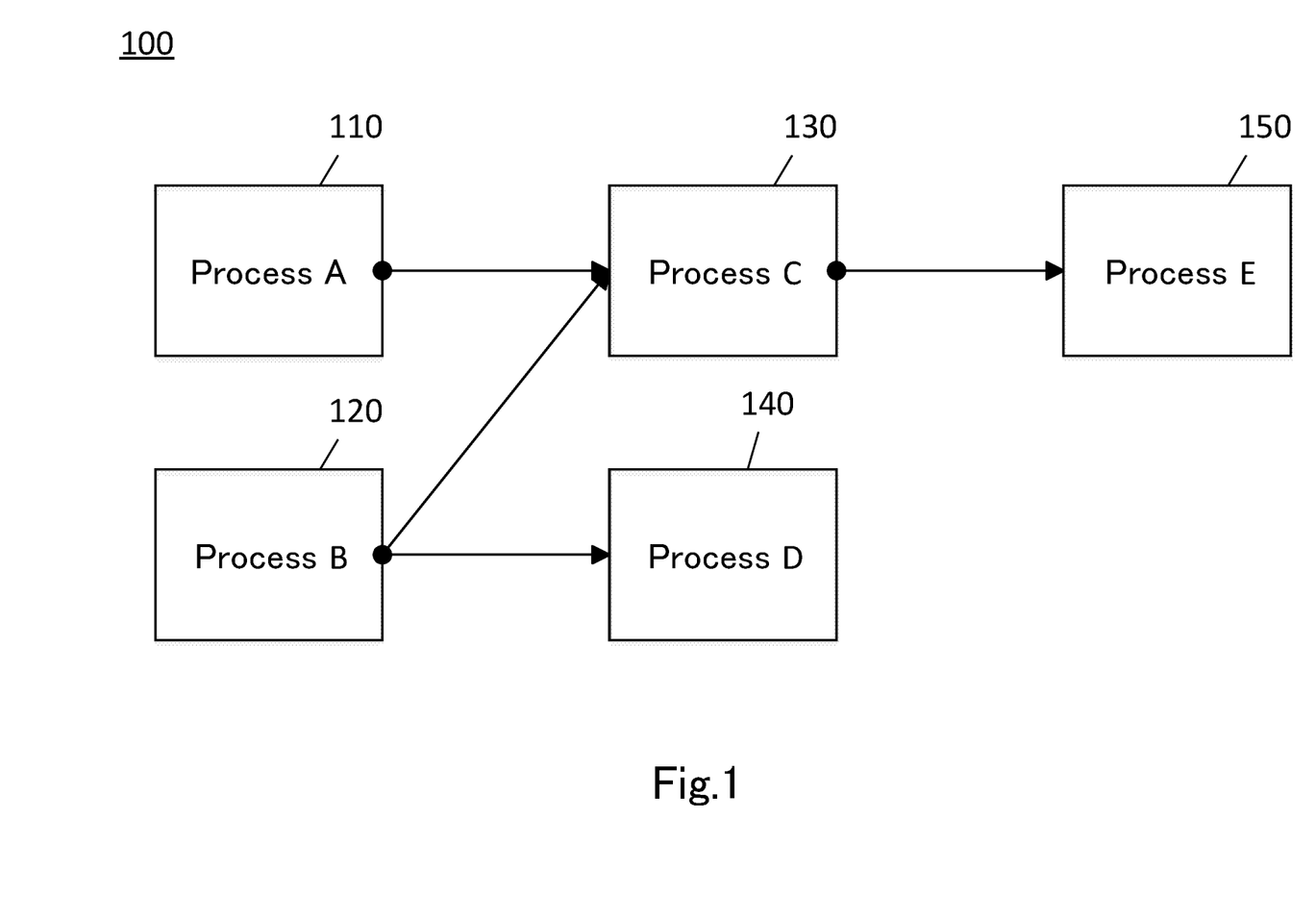
FIG. 1 is a diagram showing an execution order of each process in a production process including a plurality of processes according to an embodiment of the present technology.

FIG. 1 is a diagram showing an execution order of each process in a production process 100 including a plurality of processes A through E. In FIG. 1, process A110 and process B120 do not have their preceding processes, and execution of any process does not require that the other processes have been completed. When process A110 and process B120 are completed, process C130 of the subsequent process can be started. When process B120 is completed, the subsequent process D140 can be executed. When process C130 is completed, the subsequent process E150 can be executed. When process D140 and process E150 are completed, the production process 100 is completed.

Table 1 shows an example of resources necessary for executing each process of FIG. 1. In Table 1, the resource X is necessary to execute process A, the resource X is exclusively used (hereinafter, also referred to as "bound") at the start of execution of process A, and the resource X is released at the end of execution of process A. Similarly, resource X and resource Y are bound as necessary to execute process B, resource Y and resource Z are bound as necessary to execute process C, resource X and resource Y are bound as necessary to execute process D, and resource Z is bound as necessary to execute process E. Here, it is assumed that each resource has only one resource and that it cannot be used for a plurality of processes at the same time.

TABLE 1

| Process | Resource |
|---------|----------|
| A | X |
| B | X, Y |
| C | Y, Z |
| D | X, Y |
| E | Z |

Table 2 shows an example of a table for expressing the allocation of each process of the production schedule to resources and the execution order. In Table 2, it is possible to express to which process each of the resource X, the resource Y, and the resource Z is allocated in each time slot (9:00, 10:00, 11:00, . . . 15:00).

TABLE 2

|  | 9:00 | 10:00 | 11:00 | 12:00 | 13:00 | 14:00 | 15:00 |
|---|---|---|---|---|---|---|---|
| Resource X |  |  |  |  |  |  |  |
| Resource Y |  |  |  |  |  |  |  |
| Resource Z |  |  |  |  |  |  |  |

Table 3 shows an example of an expression using a GA for expressing allocation of each process of a production schedule to a resource and an execution order.

TABLE 3

| | Process A Time | | | | | | | | | | | | | | | | | | | | |
|---|---|---|---|---|---|---|---|---|---|---|---|---|---|---|---|---|---|---|---|---|---|
| | 9:00 | | | 10:00 | | | 11:00 | | | 12:00 | | | 13:00 | | | 14:00 | | | 15:00 | | |
| Resource | X | Y | Z | X | Y | Z | X | Y | Z | X | Y | Z | X | Y | Z | X | Y | Z | X | Y | Z |
| Gene Array Subscript | 0 | 1 | 2 | 3 | 4 | 5 | 6 | 7 | 8 | 9 | 10 | 11 | 12 | 13 | 14 | 15 | 16 | 17 | 18 | 19 | 20 |
| | Process B Time | | | | | | | | | | | | | | | | | | | | |
| | 9:00 | | | 10:00 | | | 11:00 | | | 12:00 | | | 13:00 | | | 14:00 | | | 15:00 | | |
| Resource | X | Y | Z | X | Y | Z | X | Y | Z | X | Y | Z | X | Y | Z | X | Y | Z | X | Y | Z |
| Gene Array Subscript | 21 | 22 | 23 | 24 | 25 | 26 | 27 | 28 | 29 | 30 | 31 | 32 | 33 | 34 | 35 | 36 | 37 | 38 | 39 | 40 | 41 |
| | Process C Time | | | | | | | | | | | | | | | | | | | | |
| | 9:00 | | | 10:00 | | | 11:00 | | | 12:00 | | | 13:00 | | | 14:00 | | | 15:00 | | |
| Resource | X | Y | Z | X | Y | Z | X | Y | Z | X | Y | Z | X | Y | Z | X | Y | Z | X | Y | Z |
| Gene Array Subscript | 42 | 43 | 44 | 45 | 46 | 47 | 48 | 49 | 50 | 51 | 52 | 53 | 54 | 55 | 56 | 57 | 58 | 59 | 60 | 61 | 62 |

TABLE 3-continued

| | Process D Time | | | | | | | | | | | | | | | | | | | | |
|---|---|---|---|---|---|---|---|---|---|---|---|---|---|---|---|---|---|---|---|---|---|
| | 9:00 | | | 10:00 | | | 11:00 | | | 12:00 | | | 13:00 | | | 14:00 | | | 15:00 | | |
| Resource | X | Y | Z | X | Y | Z | X | Y | Z | X | Y | Z | X | Y | Z | X | Y | Z | X | Y | Z |
| Gene Array Subscript | 63 | 64 | 65 | 66 | 67 | 68 | 69 | 70 | 71 | 72 | 73 | 74 | 75 | 76 | 77 | 78 | 79 | 80 | 81 | 82 | 83 |

| | Process E Time | | | | | | | | | | | | | | | | | | | | |
|---|---|---|---|---|---|---|---|---|---|---|---|---|---|---|---|---|---|---|---|---|---|
| | 9:00 | | | 10:00 | | | 11:00 | | | 12:00 | | | 13:00 | | | 14:00 | | | 15:00 | | |
| Resource | X | Y | Z | X | Y | Z | X | Y | Z | X | Y | Z | X | Y | Z | X | Y | Z | X | Y | Z |
| Gene Array Subscript | 84 | 85 | 86 | 87 | 88 | 89 | 90 | 91 | 92 | 93 | 94 | 95 | 96 | 97 | 98 | 99 | 100 | 101 | 102 | 103 | 104 |

In Table 3, subscripts 0 to 104 for identifying an arbitrary combination of a process, a time, and a resource are allocated such that a gene array subscript when allocating process A to the resource X at time 9:00 is 0, a gene array subscript when allocating process A to the resource Y at time 9:00 is 1, and a gene array subscript when allocating process A to the resource Z at time 9:00 is 2.

According to the example of Table 3, one individual is represented by an array of 105 gene bits 0s and 1s. An example of the expanded array is represented as "010000100000100111000010001001000100. 001000010010".

An example of the above array is also shown in Table 4.

TABLE 4

| | Process A Time | | | | | | | | | | | | | | | |
|---|---|---|---|---|---|---|---|---|---|---|---|---|---|---|---|---|
| | 9:00 | | | 10:00 | | | 11:00 | | | 12:00 | | | 13:00 | | | 14:00 |
| Resource | X | Y | Z | X | Y | Z | X | Y | Z | X | Y | Z | X | Y | Z | X |
| Array Subscript | 0 | 1 | 2 | 3 | 4 | 5 | 6 | 7 | 8 | 9 | 10 | 11 | 12 | 13 | 14 | 15 |
| Value | 0 | 1 | 0 | 0 | 0 | 0 | 0 | 1 | 0 | 0 | 0 | 0 | 0 | 1 | 0 | 0 |

| | Process | | | | | | | | | | | | | | |
|---|---|---|---|---|---|---|---|---|---|---|---|---|---|---|---|
| | A | | | B | | | | | | | | | | | |
| | Time | | | | | | | | | | | | | | |
| | 14:00 | | | 15:00 | | | 9:00 | | | 10:00 | | | 11:00 | | 12:00 |
| Resource | Y | Z | X | Y | Z | X | Y | Z | X | Y | Z | X | Y | Z | X |
| Array Subscript | 16 | 17 | 18 | 19 | 20 | 21 | 22 | 23 | 24 | 25 | 26 | 27 | 28 | 29 | 30 |
| Value | 1 | 1 | 1 | 0 | 0 | 0 | 0 | 1 | 0 | 0 | 0 | 1 | 0 | 0 | 1 |

Table 4 shows that in process A, resource Y is allocated at 9 o'clock, resource Y is allocated at 11 o'clock, resource Y is allocated at 13 o'clock, resources Y and Z is allocated at 14 o'clock, and resource X is allocated at 15 o'clock, respectively. In process B, resource Z is allocated at 9 o'clock, resource X is allocated at 11 o'clock, and resource X is allocated at 12 o'clock. Similarly, allocation of resources to the respective processes is shown.

CITATION LIST

Patent Literature

Patent Document 1: Japanese Published Unexamined Patent Application No. 2003-280714

SUMMARY

Technical Problem

However, this example is not applicable to an actual process because process A is executed many times, a plurality of processes are allocated to the same resource at the same time, or resources that need to be allocated at the same time to a particular process are not allocated (for example, process B needs both X and Y to be 1 at the same time).

According to this expression form, there are $2^{105}$ (approximately $4.05*10^{31}$) combinations of 0s and 1s, and a feasible and optimal solution may be obtained for all combinations. However, since feasible solutions are very rare in the entire solution space in the first place, there is room for improvement in terms of efficiency in performing calculations for all combinations.

In addition, when such an expression is used, there is a high possibility that most of the solutions become infeasible solutions due to constraints due to the order relationship among the respective processes, conflict among resources that can be used by the respective processes, conflict among resources at the same time, and the like, and even a feasible solution that rarely appears becomes an infeasible solution due to a subsequent operation (crossover or mutation) by the GA, and thus "optimization" does not easily proceed. Therefore, it is conceivable to adopt a simpler model without considering complicated conditions such as the order relationship between processes, but such a method has room for improvement in terms of practicality.

Furthermore, when such an expression is used, for example, it is difficult to set a fine time interval such as 10:12 to 11:37, and thus there is room for improvement in terms of practicality.

Solution to Problem

The present technology includes, for example, a method for allocating resources to a production process having a plurality of processes by a computer, the method including: allocating priorities to the plurality of processes; selecting processes executable at a first time among the plurality of processes and capable of allocating necessary resources; allocating necessary resources to the selected processes in descending order of priorities; selecting processes executable at a second time that is later than the first time among the plurality of processes and capable of allocating necessary resources; and allocating necessary resources to the selected processes in descending order of priorities. The present technology also includes, as a method of expressing genes of GA, not having direct allocation information for genes but having information (priority) for determining an order for allocation.

DESCRIPTION OF EMBODIMENTS

Figure 2:
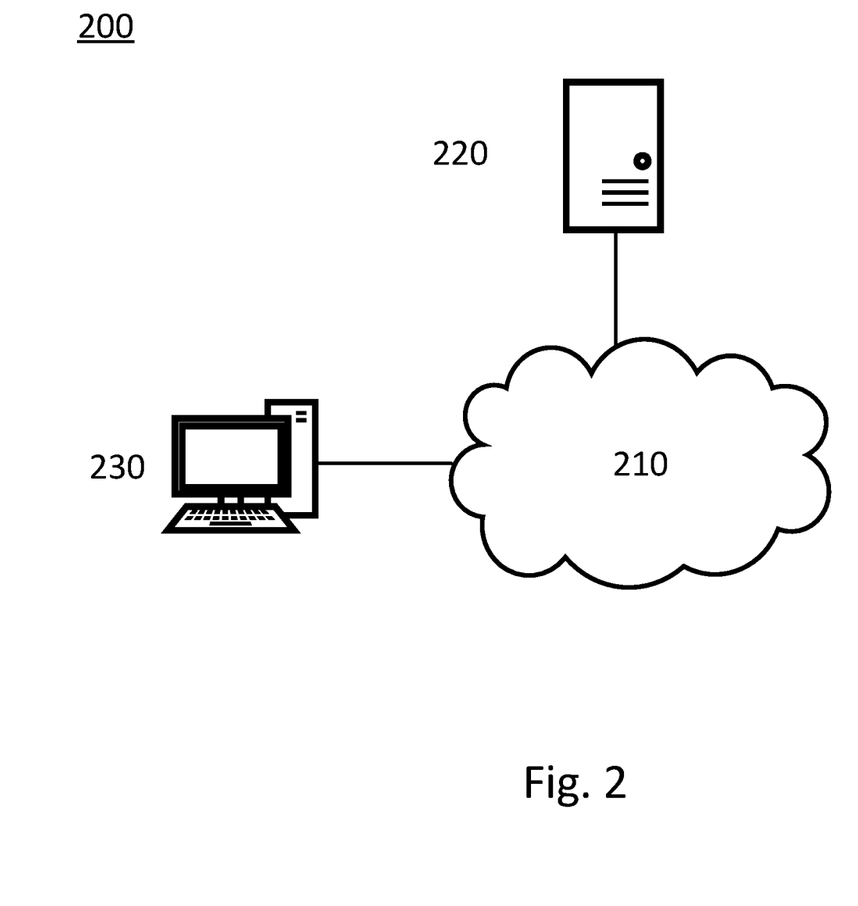
FIG. 2 illustrates a system in which a computer allocates resources to a production process having a plurality of processes, in accordance with an embodiment of the present technology.

FIG. 2 illustrates a system for a computer to allocate resources to a production process having a plurality of processes in accordance with an embodiment of the present technology.

The system 200 for allocating resources includes a network 210, a server 220, and a client 230.

The network 210 communicably connects a plurality of devices such as the server 220 and the client 230. The network 210 may be the Internet, a local area network (LAN), or a wide area network (WAN). In addition, the network 210 may be configured in a wired or wireless manner, or a combination thereof.

The server 220 is a computer having a processor (not shown), a memory (not shown) storing a program, and a communication function (not shown). The server 220 executes a program stored in the memory in response to a request from the client 230, and returns the result to the client 230. In the present application, a "memory" includes not only a main storage device such as a random access memory (RAM) and a read only memory (ROM) but also an auxiliary storage device such as a hard disk drive (HDD) and a solid state drive (SSD).

The client 230 is a computer, a tablet terminal, a smartphone, or the like having a function of communicating with the server 220 and other devices via the network 210. The number of clients 230 may be one or more.

Figure 3:
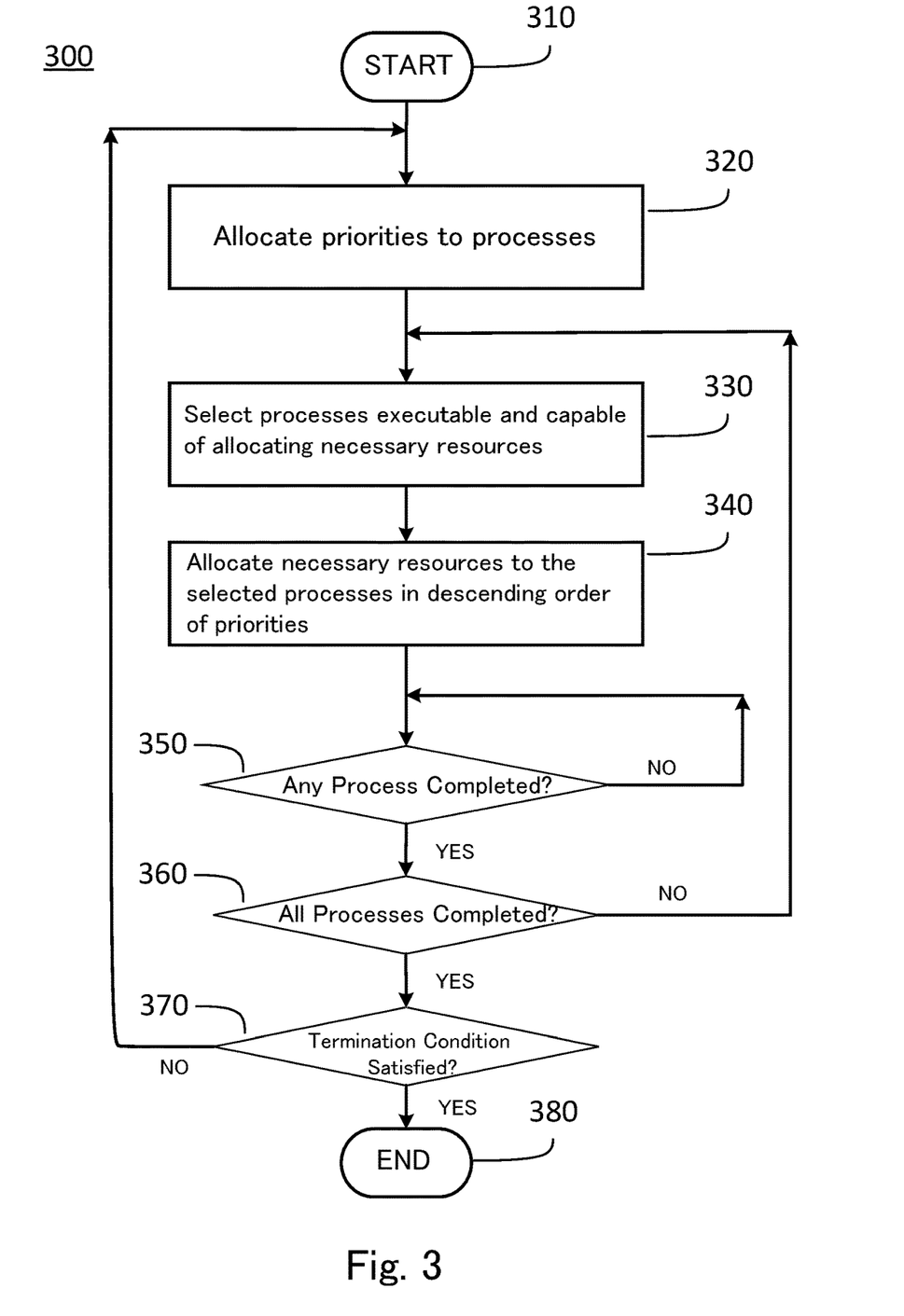
FIG. 3 is a flow chart illustrating a method for allocating resources to a production process in accordance with an embodiment of the present technology.

FIG. 3 illustrates a flowchart of a method for allocating resources to a production process in accordance with an embodiment of the present technology.

The resource allocation method 300 according to the present technology begins at step 310, and at step 320, the server 220 prioritizes each process in the production process. The priority given to each process may be unique or may be arbitrarily selected. In addition, the priority may be randomly selected and/or expressed as a real number.

Next, in step 330, the server 220 selects processes that can be executed and to which the necessary resources can be allocated. An executable process may be a process that has not been executed and has no preceding process that has not been executed. The process to which the necessary resources can be allocated may be a process in which all the necessary resources are available.

Next, in step 340, the server 220 allocates the necessary resources to each of the selected processes in descending order of priority. Allocating the necessary resources to the selected processes in descending order of priority may be allocating resources until there are no more processes to which resources can be allocated.

Next, in step 350, the server 220 determines whether any of the processes has been completed. If it is determined that any of the processes has been completed, the process proceeds to step 360. If it is determined that none of the processes has been completed, the process returns to step 350, and is repeated until it is determined that any of the processes has been completed.

When any of the processes is completed in step 350, the server 220 determines whether all processes are completed in step 360. If it is determined that all the processes have been completed, the process proceeds to step 370. When it is determined that any of the processes has not been completed, the process returns to step 330, and the server 220 selects a process which can be executed at that time and to which necessary resources can be allocated. The time may be the earliest time among the end times of a plurality of processes to which resources are allocated.

When all the processes are completed in step 360, it is determined in step 370 whether or not a termination condition is satisfied, such as calculation for a predetermined number of generations or only the same solution for a certain period of time. If the termination condition is not satisfied, the array of priorities and the end times or required times of all the processes are stored as one solution, and the process returns to step 320. If the termination condition is satisfied, then the previous solutions are compared and, for example, the one whose end time is not later than any other is taken as the optimal solution, and the resource allocation method 300 terminates at step 380. The comparison of the solutions may be sequentially compared with the previous solution every time all the processes are completed in step 360 with respect to one array of the priority, and a solution whose end time is not later may be set as a new solution. When the end time is the same, the previous solution may be maintained as it is.

A more detailed embodiment of the present technology will now be described with reference to FIGS. 1 and 3.

In Table 5, processes A through E in FIG. 1 are prioritized according to step 320 in FIG. 3. In this example, the priority order is represented by a real number in a range of 0 to 1, and a larger value is a higher priority order, that is, to be allocated first. The priority value may be a sufficiently large integer value that is unlikely to overlap. An exclusive integer may be used, but when two individuals are crossed, values may be overlapped, and another means for eliminating the overlap is required. Even when the priority is expressed by a real number, there is a possibility of being overlapped mathematically, but it is extremely rare that a problem may occur when there is a conflict. In this case, it is considered to be sufficient for practical use if, for example, the one appearing earlier is selected.

When the example of Table 5 is expressed by a program such as C #, for example, like "double[ ] g=new double[ ]{0.5, 0.1, 0.4, 0.2, 0.6};", the genes of the individuals in the GA can be expressed as array data including priority information for determining the order in which the computer allocates solutions. Since the gene of the individual includes the priority information, it is not necessary to include the information itself of the solution allocated to the gene of the individual.

TABLE 5

|  | Process | | | | |
| --- | --- | --- | --- | --- | --- |
|  | A | B | C | D | E |
| Array Subscript | 0 | 1 | 2 | 3 | 4 |
| Value(Priority) | 0.5 | 0.1 | 0.4 | 0.2 | 0.6 |

Next, according to step 330, a process that can be executed and to which necessary resources can be allocated is selected. At the process start time, processes A and B can be allocated from the order of the processes. In accordance with step 340, since the priority of process A is greater when comparing the priorities of processes A and B, the necessary resource X is allocated to process A as shown in Table 6.

TABLE 6

| ResourceX | A |
| --- | --- |
| ResourceY |  |
| ResourceZ |  |

Since the resource X among the necessary resources is already allocated to process A and cannot be used for process B that can be executed at the same time, none of the resources is allocated to process B. Since process A and process B, which are the preceding processes of process C, are not completed, no resource is allocated to process C. Since process B, which is the preceding process of process D, has not been completed, no resource is allocated to process D.

When process A is completed in step 350, the production process proceeds to step 360, and the production process returns to step 330 because all the processes have not been completed yet at this time. In step 330, a process that can be executed and to which necessary resources can be allocated is selected. At the end time of process A, it is only process B that can be allocated from the order relationship of the process. It is shown in Table 7 that after the end of process A, the necessary resources X and Y are allocated to process B.

TABLE 7

| ResourceX | A | B |
| --- | --- | --- |
| ResourceY |  | B |
| ResourceZ |  |  |

Since process A and process B, which are the preceding processes of process C, are not completed, no resource is allocated to process C. Since process B, which is the preceding process of process D, has not been completed, no resource is allocated to process D.

When process B is completed, a process which can be executed and to which necessary resources can be allocated is selected according to step 330 again in the same manner as described above. At the end time of process B, processes C and D can be allocated based on the order relationship of the processes. Comparing the priorities of processes C and D according to step 340, since the priority of process C is greater, the necessary resources Y and Z are allocated to process C as shown in Table 8.

TABLE 8

| ResourceX | A | B |  |
| --- | --- | --- | --- |
| ResourceY |  | B | C |
| ResourceZ |  |  | C |

For process D that can be executed at the same time, since the resource Y among the necessary resources has already been allocated to process C and cannot be used, none of the resources is allocated to process D.

When process C is completed, a process which can be executed and to which necessary resources can be allocated is selected in accordance with step 330 again in the same manner as described above. At the end time of process C, processes D and E can be allocated based on the order relationship of the processes. When the priorities of processes D and E are compared in accordance with step 340, since the priority of process E is greater, the necessary resource Z is allocated to process E as shown in Table 9.

TABLE 9

| ResourceX | A | B |  |  |
| --- | --- | --- | --- | --- |
| ResourceY |  | B | C |  |
| ResourceZ |  |  | C | E |

For process D that can be executed at the same time, since both of the necessary resources X and Y are not allocated and available, the necessary resources X and Y are allocated to process D as shown in Table 10.

TABLE 10

| ResourceX | A | B |  | D |
| --- | --- | --- | --- | --- |
| ResourceY |  | B | C | D |
| ResourceZ |  |  | C | E |

Upon completion of processes D and E, according to step 360, it is determined whether a termination condition is satisfied, and if not, the solution is stored and the process returns to step 320, and if the termination condition is satisfied, an optimal solution among the previously stored solutions is determined, and the resource allocation method 300 ends at step 380.

In the above example, when the time required for each process is one hour, a schedule as shown in Table 11 can be created.

TABLE 11

|   | 9:00 | 10:00 | 11:00 | 12:00 | 13:00 | 14:00 | 15:00 |
|---|------|-------|-------|-------|-------|-------|-------|
| X | A    | B     |       | D     |       |       |       |
| Y |      |       | C     |       |       |       |       |
| Z |      |       |       | E     |       |       |       |

Further, in the case where the respective processes have different required times (not necessarily in units of one hour), a schedule as shown in Table 12 can be created. In Table 12, the start time and the end time of each process can be recursively obtained based on the end time of the process executed before that, for example, start time of process C=end time of process B, (end time of process B=start time of process B+required time of process B, start time of process B= . . . ). If process F using the resources Y and Z is finally present, the start time of process F is the end time of processes D and E, whichever is not earlier (MAX). For simplicity, the end time of a process and the start time of the next process are the same, but a certain time interval may be provided between processes, or the time required for preparation or transition of processes may be included in the required time of the process or the next process.

TABLE 12

|   | 9:00 | 10:00 | 11:00 | 12:00 | 13:00 | 14:00 | 15:00 |
|---|------|-------|-------|-------|-------|-------|-------|
| X | A    | B     |       | D     |       |       |       |
| Y |      |       |       | C     |       |       |       |
| Z |      |       |       |       | E     |       |       |

Returning to step 320, Tables 13 and 14 show examples in which different priorities are allocated and the results of expansion thereof. In this case, genes of individuals can be expressed as array data as in an actual program (for example, in C #, double[ ] g=new double[ ]{0.5, 0.7, 0.4, 0.8, 0.6}).

TABLE 13

|                  | Process |     |     |     |     |
|------------------|---------|-----|-----|-----|-----|
|                  | A       | B   | C   | D   | E   |
| Array Subscript  | 0       | 1   | 2   | 3   | 4   |
| Value(Priority)  | 0.5     | 0.7 | 0.4 | 0.8 | 0.6 |

TABLE 14

|   | 9:00 | 10:00 | 11:00 | 12:00 | 13:00 | 14:00 | 15:00 |
|---|------|-------|-------|-------|-------|-------|-------|
| X |      | B     | D     | A     |       |       |       |
| Y |      |       |       |       | C     |       |       |
| Z |      |       |       |       |       | E     |       |

When Table 12 and Table 14 are compared, it can be said that the allocation result of Table 12 is a better individual, i.e., a more suitable solution, in that the entire process is completed earlier.

INDUSTRIAL APPLICABILITY

According to the present technology, the resources are sequentially allocated in accordance with the execution order of the processes, and the priority can be used as a method of solving selection in a case where there is a conflict (there are a plurality of choices). Therefore, all individuals (solution candidates) are always feasible solutions, and a more suitable solution can be searched more efficiently than the conventional method in which a feasible solution rarely appears.

REFERENCE SIGNS LIST 210 network
220 Server
230 Client

The invention claimed is:

1. A method for allocating resources to a production process having a plurality of processes using a genetic algorithm (GA), the method comprising:
    allocating priorities which are randomly selected to the plurality of processes and which correspond to genes of individuals in the GA;
    selecting processes executable at a first time among the plurality of processes and to which necessary resources are capable of being allocated,
        wherein the necessary resources for the processes executable at the first time are allocated is allocated for use by one selected process at a time;
    allocating the necessary resources to the processes executable at the first time in descending order of priorities;
    selecting processes executable at a second time that is later than the first time among the plurality of processes and to which necessary resources are capable of being allocated,
        wherein the necessary resources for the processes executable at the second time are allocated is allocated for use by one selected process at a time; and
    allocating the necessary resources to the processes executable at the second time in descending order of priorities.

2. The method according to claim 1, wherein each of the priorities allocated to the plurality of processes is unique.

3. The method according to claim 1, wherein the priorities are represented by a real number.

4. The method according to claim 1, wherein the processes executable at the second time are not yet executed and have no unexecuted preceding processes.

5. The method according to claim 1, wherein the processes capable of allocating necessary resources are processes for which all of the necessary resources are available.

6. The method according to claim 1, wherein the allocating necessary resources to the selected processes in descending order of priorities includes allocating resources until there are no more processes available for resource allocation.

7. The method according to claim 1, wherein the second time is the earliest time among end times of the processes to which the resources are allocated.

8. The method according to claim 1, further comprising repeating the selecting processes and allocating the necessary resources until all of the plurality of processes are completed.

9. The method according to claim 8, further comprising:
    setting a time at which all of the plurality of processes are completed in accordance with a prioritized order with resources having been allocated thereto as a third time;
    setting a time at which all of the plurality of processes are completed when priorities different from the priorities are allocated to the plurality of resources as a fourth time; and
    selecting the priority corresponding to the third time or the fourth time which is not later.

10. The method according to claim 9, further comprising:
    calculating end times for the plurality of processes in accordance with different prioritized orders until a predetermined number of processes or a predetermined amount of time has elapsed.

11. A system in which a computer allocates resources to a production process having a plurality of processes using a genetic algorithm (GA), configured to:
    allocate priorities which are randomly selected to the plurality of processes and which correspond to genes of individuals in the GA;
    select processes executable at a first time among the plurality of processes and to which necessary resources are capable of being allocated,
        wherein the necessary resources for the processes executable at the first time are allocated is allocated for use by one selected process at a time;
    allocate necessary resources to the processes executable at the first time in descending order of priorities;
    select processes executable at a second time that is later than the first time among the plurality of processes and to which necessary resources are capable of being allocated,
        wherein the necessary resources for the processes executable at the second time are allocated is allocated for use by one selected process at a time; and
    allocate necessary resources to the processes executable at the second time in descending order of priorities.

12. A non-transitory computer-readable medium for allocating resources to a production process having a plurality of processes using a genetic algorithm (GA), the non-transitory computer-readable medium comprising instructions which, when executed by a computer, cause the computer to carry out:
    allocating priorities which are randomly selected to the plurality of processes and which correspond to genes of individuals in the GA;
    selecting processes executable at a first time among the plurality of processes and to which necessary resources are capable of being allocated,
        wherein the necessary resources for the processes executable at the first time are allocated is allocated for use by one selected process at a time;
    allocating necessary resources to the processes executable at the first time in descending order of priorities;
    selecting processes executable at a second time that is later than the first time among the plurality of processes and to which necessary resources are capable of being allocated,
        wherein the necessary resources for the processes executable at the second time are allocated is allocated for use by one selected process at a time; and
    allocating necessary resources to the processes executable at the second time in descending order of priorities.

* * * * *